(12) United States Patent
Souza et al.

(10) Patent No.: US 10,713,855 B2
(45) Date of Patent: Jul. 14, 2020

(54) COMPUTERIZED METHOD FOR CREATING AND EDITING SURFACES TO REPRESENT GARMENTS ON THE BODY OF A MANNEQUIN IN A VIRTUAL THREE-DIMENSIONAL ENVIRONMENT

(71) Applicant: AUDACES AUTOMAÇÃO E INFORMÁTICA INDUSTRIAL LTDA corporation, Florianópolis (BR)

(72) Inventors: Marco Santos Souza, Florianópolis (BR); Mateus De Souza, Florianópolis (BR); Gabriela Aguiar Bauer, Florianópolis (BR); Victor Botamedi, Florianópolis (BR); Ricardo Luiz Delfino Cunha, Florianópolis (BR); Márcio Barcellos Da Silva, Florianópolis (BR)

(73) Assignee: Audaces Automacao E Informatica Industrial LTDA, Bairro Joao Paulo, Florianopolis (BR)

( * ) Notice: Subject to any disclaimer, the term of this patent is extended or adjusted under 35 U.S.C. 154(b) by 0 days.

(21) Appl. No.: 15/766,297

(22) PCT Filed: Sep. 22, 2016

(86) PCT No.: PCT/BR2016/050234
§ 371 (c)(1),
(2) Date: Apr. 5, 2018

(87) PCT Pub. No.: WO2017/059511
PCT Pub. Date: Apr. 13, 2017

(65) Prior Publication Data
US 2018/0300959 A1 Oct. 18, 2018

(30) Foreign Application Priority Data
Oct. 9, 2015 (BR) .......................... 102015025867

(51) Int. Cl.
*G06T 19/20* (2011.01)
*G06T 13/40* (2011.01)
(Continued)

(52) U.S. Cl.
CPC ............... *G06T 19/20* (2013.01); *A41H 3/00* (2013.01); *G06F 30/00* (2020.01); *G06T 13/40* (2013.01);
(Continued)

(58) Field of Classification Search
None
See application file for complete search history.

(56) References Cited

U.S. PATENT DOCUMENTS

| 7,079,114 B1 * | 7/2006 | Smith | G06F 3/0304 345/158 |
| 8,269,778 B1 * | 9/2012 | Baraff | G06T 13/20 345/156 |

(Continued)

OTHER PUBLICATIONS

Taylor, Andrew, et al. "3D digital technologies: Sculpting, modelling & construction of patterns for costume & clothing." (2013): 1-45.*

(Continued)

*Primary Examiner* — Ryan M Gray
(74) *Attorney, Agent, or Firm* — Henry J. Cittone; Cittone Demers & Arneri LLP

(57) ABSTRACT

The invention relates to a computerised method for creating and editing, using a computer, surfaces used to represent garments on the body of a mannequin (22) in a virtual three-dimensional environment. The method consists in using digital sculpting techniques and tools in conjunction with physical cloth simulation in order to modify freely and quickly the shape of a garment on the body of a mannequin (22).

4 Claims, 8 Drawing Sheets

(51) Int. Cl.
  *A41H 3/00*    (2006.01)
  *G06T 17/20*   (2006.01)
  *G06T 17/30*   (2006.01)
  *G06F 30/00*   (2020.01)

(52) U.S. Cl.
  CPC ............ *G06T 17/20* (2013.01); *G06T 17/205* (2013.01); *G06T 17/30* (2013.01); *G06T 2210/16* (2013.01); *G06T 2219/2021* (2013.01)

(56) References Cited

U.S. PATENT DOCUMENTS

| | | | | |
|---|---|---|---|---|
| 9,659,396 | B1* | 5/2017 | Chang | G06T 13/20 |
| 2006/0015208 | A1* | 1/2006 | Reyes Moreno | A41H 3/007 700/132 |
| 2014/0114620 | A1* | 4/2014 | Grinspun | A41H 3/007 703/1 |

OTHER PUBLICATIONS

Souza, Marco Santos. "Simulação interativa de tecidos e roupas: técnicas para o desenvolvimento de um simulador." (2014).*
Grant, Ian, and Dan Hughes-McGrail. "3D Digital Visualisation for Fashion and Textiles a Practical Survey of Tools and Techniques."*
Igarashi, Takeo, and John F. Hughes. "Clothing manipulation." Proceedings of the 15th annual ACM symposium on User interface software and technology. ACM, 2002.*
Dewaele, Guillaume, and Marie-Paule Cani. "Interactive global and local deformations for virtual clay." Graphical Models 66.6 (2004): 352-369.*

\* cited by examiner

COMPUTERIZED METHOD FOR CREATING AND EDITING SURFACES TO REPRESENT GARMENTS ON THE BODY OF A MANNEQUIN IN A VIRTUAL THREE-DIMENSIONAL ENVIRONMENT

FIELD OF THE INVENTION

The present invention belongs to the field of computerized methods. It relates to a computerized method for the creation and visualization of garments in a virtual, three-dimensional medium.

The techniques employed in the method presented in the invention are studied in the field known as computer graphics, which is a sub-area of computer science. More specifically, use is made of digital sculpting and physics-based animation techniques, which are topics of study of computer graphics.

Background Information

A garment is made up of flat surfaces generally manufactured from fabric (e.g. cotton, wool, silk). Such flat surfaces are called molds. Different molds should be sown together to make a garment. On its turn, the garment should fit on the body volume of the person wearing such garment.

The development of a garment generally starts by a design of the final garment on a person's body. Then, to generate the real garment, molds should be created and the seams between them determined in order to manufacture the designed garment.

The person in charge of the garment starting design is not necessarily the same person who creates the molds. For this reason it is important that the design casts no doubts as regards the creator's intention: he must communicate in the best possible way how the real garment must be.

There are several computer software programs designed to aid in the creation of the starting design of a garment. There are software programs allowing the creation of bi-dimensional or three-dimensional representations of the garment. The software programs allowing the creation of bi-dimensional drawings illustrate the garment seen from a fixed point in space, analogously to a pencil-made drawing on a paper sheet. The software programs which allow the creation of three-dimensional drawings provide a more accurate picture of volume and allow the manipulation and visualization of the garment created under different points of view.

U.S. Pat. No. 7,409,259B2 teaches a method and a computer software program for creating three-dimensional representations of garments on the body of a virtual mannequin. The software program exhibits a mannequin body, at first clothed with a piece of garment tight to the body and covering most of same. According to the described method the garment surface is represented by a parametric surface described by a set of control spots. These spots are used to define the garment surface on the mannequin body. The user can alter the position of these control spots to change the surface shape, enlarging or tightening the garment portions at will.

On the basis of the method of the U.S. Pat. No. 7,409,259B2 the user is not able to alter the garment topology surface which is provided at first. This limits the amount of different kinds of garments which can be created. In order to overcome this problem, the software program described in the said U.S. patent enables the user to choose three different kinds of initial molds for the garment surface: trouser mold, skirt mold or cloak mold.

The computerized method described in the present application has the same object as the computerized method object of said U.S. Pat. No. 7,409,259B2: enable the design in a virtual medium of three-dimensional representations of a garment on a mannequin body.

However contrary to the method object of the above U.S. patent, the method object of the present invention does not make use of a parametric surface for representing the garment. Thus, according to the invention, the representation enables the user to freely manipulate the garment surface, altering even the topology of the starting surface. With the aid of the method described in the present invention the design of 3D garments on the body of a virtual mannequin is rendered an intuitive and simple task to perform, as will be surely demonstrated on the basis of the following description.

SUMMARY OF THE INVENTION

A computerized method for creating and editing surfaces used for representing garments on a mannequin body in a virtual three-dimensional medium.

The working and application of the method of the invention are based on a computer program which enables the designing, editing and visualization of garments in a computer.

The objective of the proposed method is to make simpler and more intuitive the task of manipulating the surface used for describing a garment on the body of a virtual mannequin in a computer program for garments in a virtual three-dimensional medium.

It should be noticed that a piece of garment, when clothed on a mannequin body defines a volume, the size of such volume being limited at the bottom by the volume of the body portion covered by the piece of garment.

It is well-known that digital sculpting software programs provide an intuitive manner for creating and editing volumetric objects in a computer. Such software programs offer tools for digitally manipulating any three-dimensional object as if this object was made of an actual malleable substance such as for example clay. One of the most popular software programs in this category is the "ZBrush" software by Pixologic.

The present method makes use of techniques and tools which are similar to those of digital sculpting software programs. In the proposed method, the garment surface behaves as if it were made of clay. Thus the user can pull, push, soften and freely deform the garment surface on the mannequin body. The mannequin body serves as a boundary to where the garment surface can be moved; that is, it is not possible to move the garment towards the interior of the mannequin body.

In state-of-the-art digital sculpting software programs—allowing the utilization of computerized methods for creating and editing garments in a virtual medium—it is not possible to detect the actual kind of the material being designed since the software programs are generic, aiming at making viable the creation of objects made of any kind of material.

Advantageously, in the computerized method of the invention it is possible to assume that the object being created is made of fabric. Thus, the proposed method provides tools that manipulate the garment surface also using physical cloth simulation.

According to the chosen tool the garment surface on the mannequin body behaves either as clay or as real fabric. It is not mandatory that the user be aware of the clay/fabric duality. The user just chooses and uses one the available tools for manipulating the garment surface. More details on the available tools are provided below in the present specification.

DETAILED DESCRIPTION OF THE INVENTION

The method proposed in the present invention is based on a computer program (the CAD software) used for designing garments. Said method allows the user to design and view any kind of garment directly on the body of a mannequin inserted in a virtual three-dimensional medium.

In the present invention, the expression "method" is used to design the techniques used and how the same are combined by the garment designing program herein described.

The invention will be described below by reference to the attached Figures.

It should be borne in mind that in the attached Figures the user is not represented.

Figure 1:
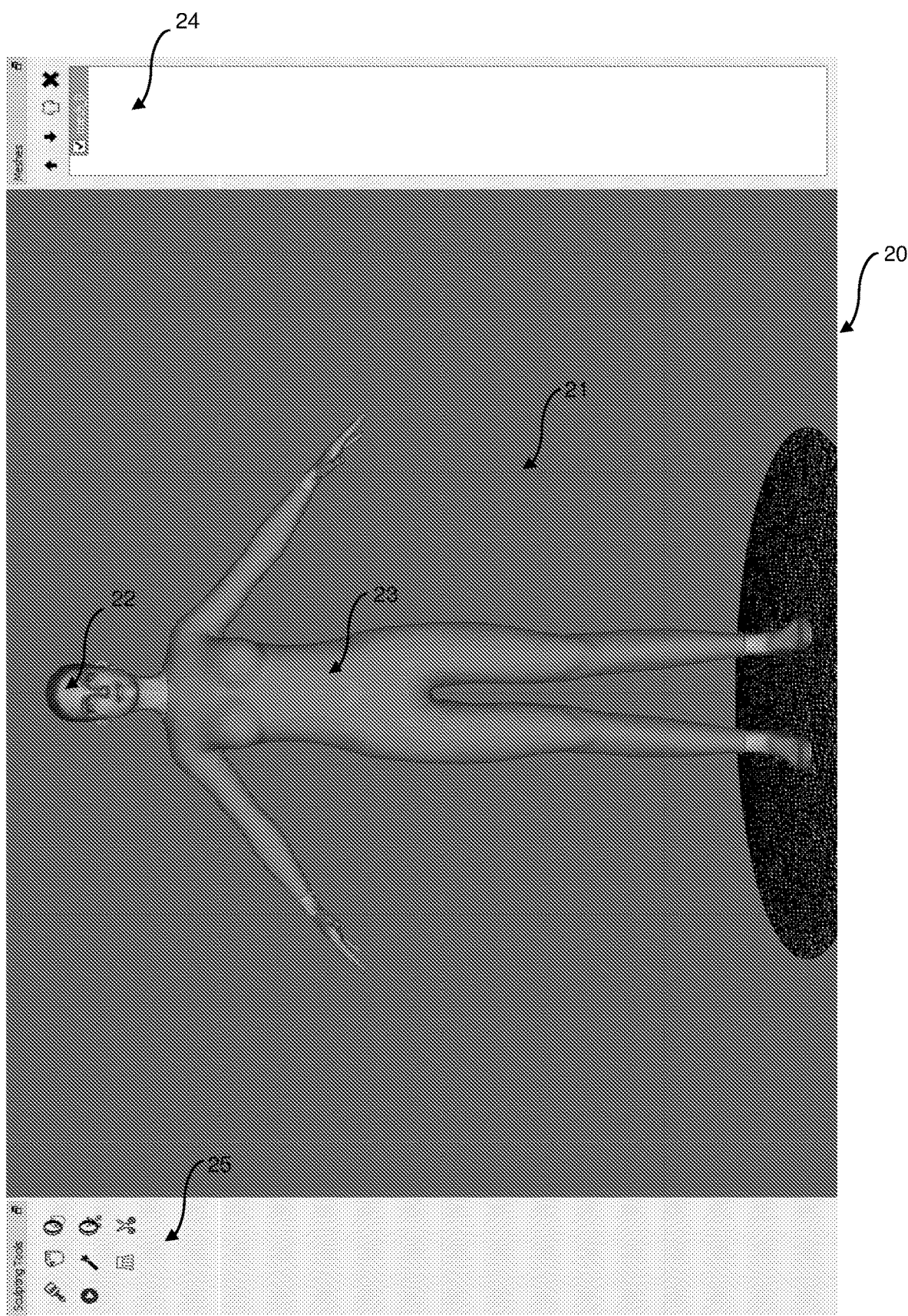
FIG. 1 attached is a screen shot of the interface of the software program for 3D creating garments used for illustrating the computerized method of the invention.

FIG. 1 is a screen shot (number reference 20) of the computer program on which is based the method proposed in the present invention.

Screen shot 20 shows that the graphical program user interface or GUI is seen by the user as three distinct areas 21, 24 and 25. The central area 21 exhibits a three-dimensional virtual medium with a mannequin body 22. By using the mouse cursor 36 and clicking on area 21 the user can freely control the position, angle and distance from which the mannequin body 22 can be viewed—it is said that there is a virtual camera (not represented) which observes mannequin 22 from a certain point of the three-dimensional space at a certain orientation or angle.

At first mannequin 22 is clothed with a tight and simple garment 23 covering most of its body. An overall piece of garment such as this one will be called mesh. A garment is formed by one or more meshes.

On the right, area 24 shows a list of meshes 23 (just one mesh is present at first, this situation being depicted in FIG. 1). The user can create new meshes 23 or remove the existing meshes.

On the left, area 25 depicts a set of tools available to the user to modify the selected meshes 23. More details on these tools are given below.

Figure 2:
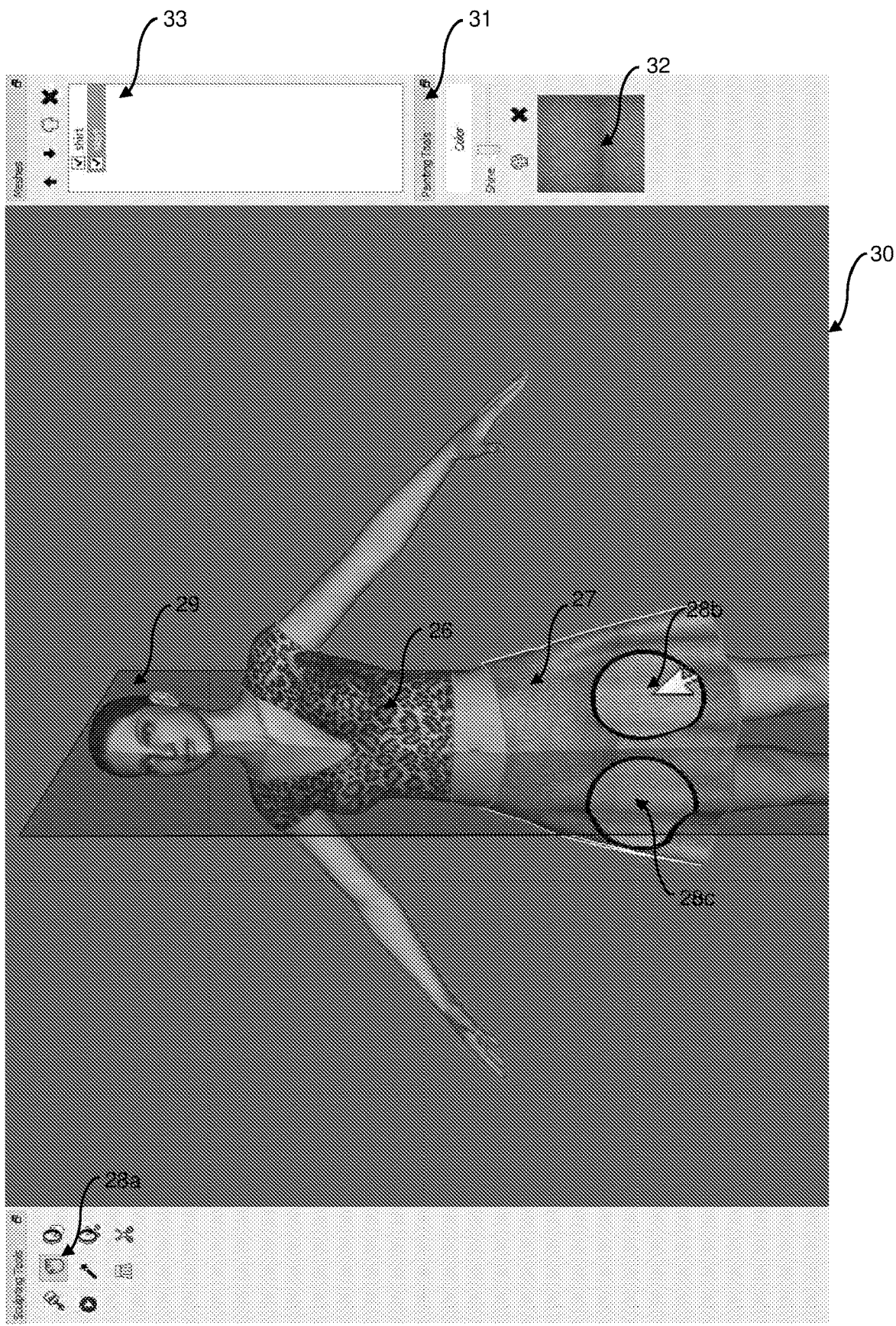
FIG. 2 attached is a screen shot showing a basic garment designed according to the computerized method of the invention.

FIG. 2 is also a screen shot 30 of the same computer program as above and depicts a more advanced step of the editing process (that is, after the user performed a few modifications). In this Figure, a symmetry plane is activated: in this way, anything the user makes on one side of the plane will be replicated on the other side.

With the aid of the available tools depicted in the left area 25 the initial mesh or piece of garment 23 represented in FIG. 1 was cut and adjusted to obtain a garment made up of two meshes: a shirt 26 and a skirt 27, as shown in FIG. 2. These two meshes are listed in area 33 on the right.

On screen shot 30 it can be seen that skirt 27 is selected in the list of area 33 on the right. The user has a selected editing tool 28a in area 25 on the left while the mouse cursor 36 is positioned on the selected mesh 28b of central area 21 of the application.

The working area 28b of editing tool 28a is highlighted in the software program central area. The user activates a symmetry plan 29; in this way, the working area and behavior of each tool is repeated, in a mirrored way, at the opposite side of plane 28c.

Still in FIG. 2, area 33 on the right also shows a few visual properties of the selected mesh 31—such as color, shine and texture—allowing the user to alter these properties. The texture exhibited on skirt 27 of central area 21, for example, is also shown in area 32.

Starting from the configuration shown in FIG. 1 and using the set of tools illustrated in area 25 on the left, the user can design any kind of garment (such as the garment shown in FIG. 2).

Figure 3:
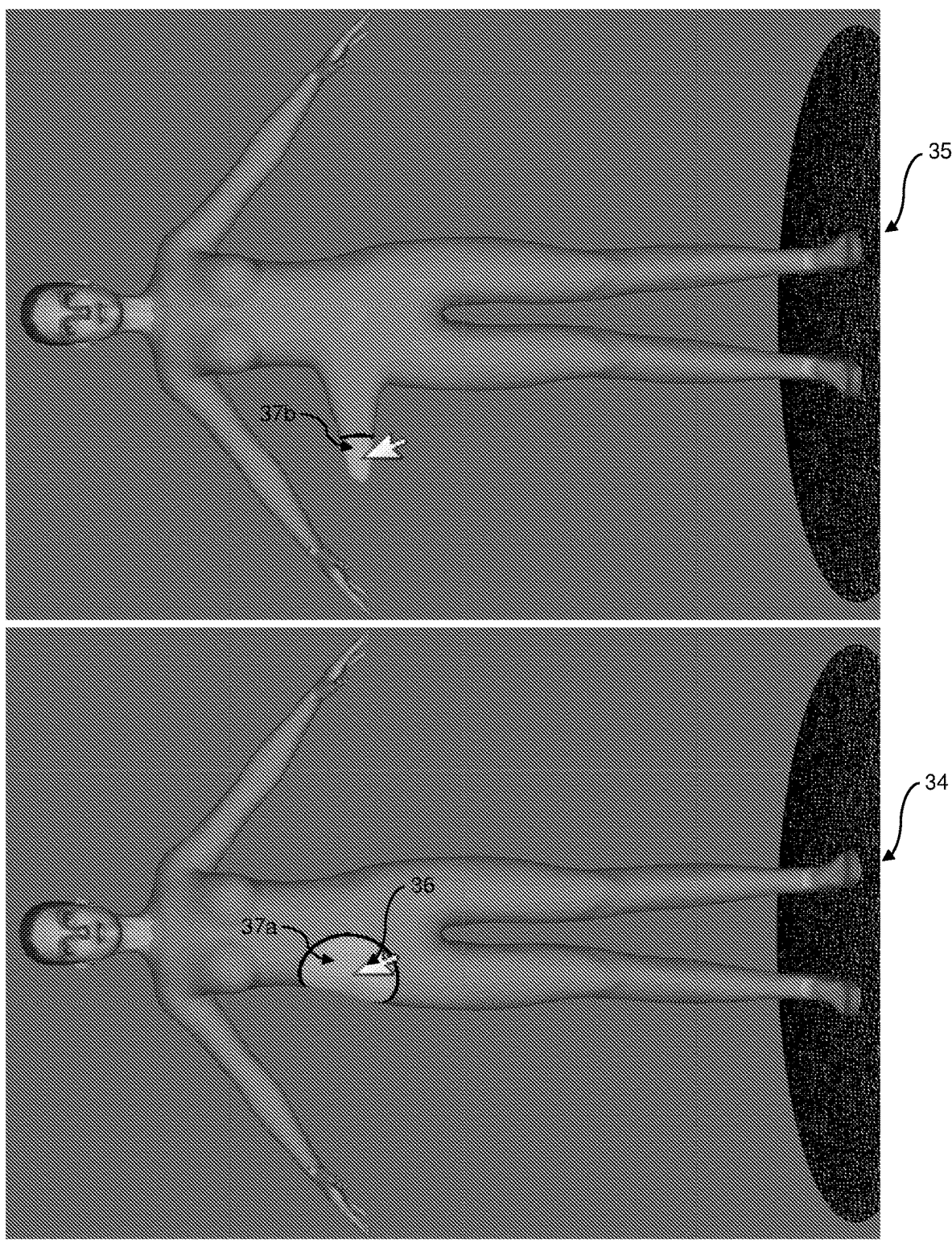
FIG. 3 attached shows the application of the pinch tool.

FIG. 3 illustrates the working of the pinch or sweep tool, such tool being very common in digital sculpting programs such as ZBrush.

The pinch tool is designed for pulling or dragging a region of the mesh surface. At a first moment 34, the user positions the mouse cursor 36 on the region he intends to drag. The tool working area 37a (that is the mesh region which will be altered) is highlighted on the mesh. Then, at 35, the user clicks with the mouse button (not represented) and drags the mouse cursor 36 towards the desired direction. The highlighted region 37b at the mesh surface follows the mouse cursor 36 movement and deforms itself.

By using the pinch tool, the user has the sensation that the mesh is made from similar to clay stuff.

The suitable positioning of the virtual camera enables one to manipulate any mesh surface spot with the aid of the pinch tool.

However, according to a distinctive aspect of the invention, the software program on the basis of the present method does not allow moving the mesh surface towards the interior of the mannequin body 22. As a consequence, the mannequin body 22 is naturally rendered a mold for the mesh surface.

A further way of pulling and dragging a mesh surface is by using the pinch ring tool. By using this tool, when the user crosses the mouse cursor 36 on the mannequin body 22 a ring (a circumference) is exhibited involving the said mannequin body 22 at a certain point and follows the mouse cursor 36.

Figure 4:
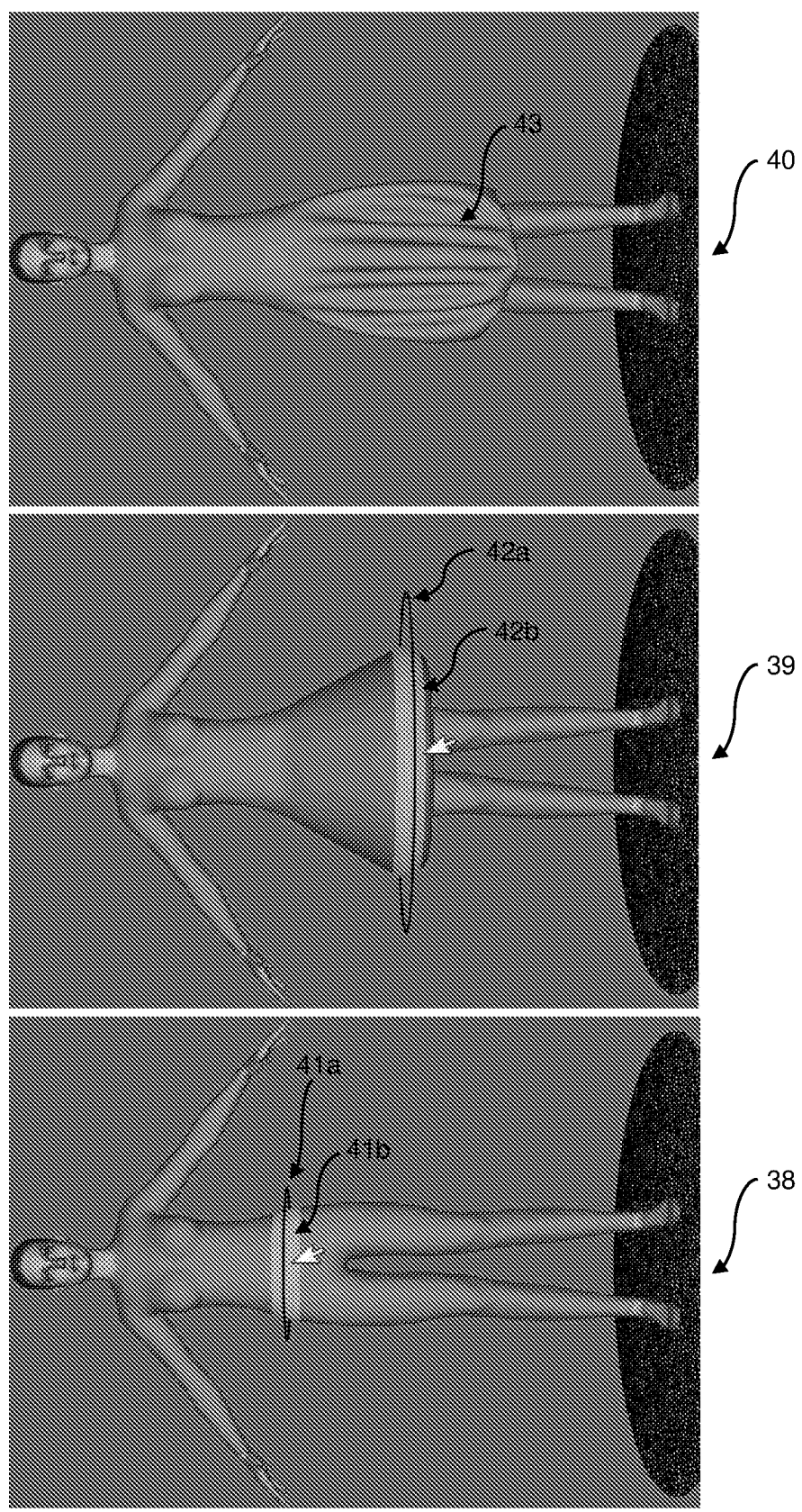
FIG. 4 attached shows the application of the pinch tool with a ring.

FIG. 4 illustrates a possible use of this tool in three situations 38, 39 and 40.

At first, at 38, the user moves the mouse cursor 36 towards a region of the said mannequin body 22 in order to position ring 41a. Ring 41a follows the mannequin body 22 and not a specific mesh. However, when the mouse cursor 36 is moved by the user ring 41a affects the surface 41b of the selected mesh which is at a certain distance of the ring plane:

the working region 41b of ring 41a is shown on the mesh surface, analogously to what occurs with the pinch tool.

At a second step 39 depicted in FIG. 4, the user clicks with the mouse button and drags cursor 36 towards the desired direction, pulling the mesh surface 41b which had been highlighted The user can choose a ring 41a opening angle, in this way, besides pulling the mesh surface 41b towards the desired direction, ring 41a also gradually increases its radius 42a during the dragging movement, making the mesh surface 41b to depart from the mannequin body 22 and to open as a cone 42b.

The pinch (FIG. 3) and pinch ring (FIG. 4) tools enable a mesh to be similar to clay since they allow the user to freely move and deform its surface as mentioned hereinbefore. However, it is also possible to make a mesh to behave as true fabric.

FIG. 4 illustrates a possible use of this property at third step 40. After pulling and opening the mesh with the pinch ring tool (38 and 39) the user activates the physical cloth simulation embodiment. Thus, under the effect of gravity, mesh 42b falls and adjusts to the mannequin body 22. This makes that fabric 43 pleats are automatically generated giving the mesh 42b the appearance of a true garment.

Figure 5:
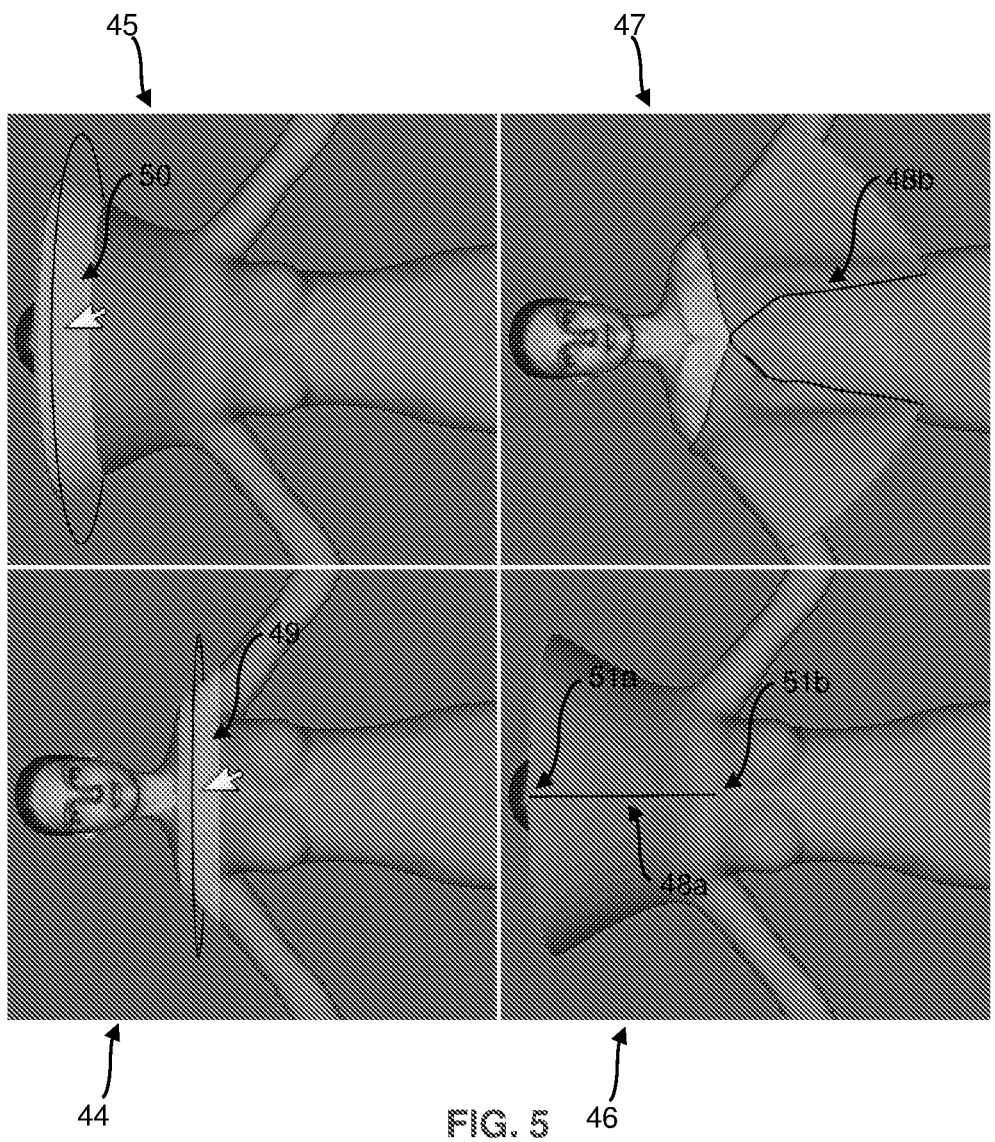
FIG. 5 attached shows the application of the pinch tool with a ring and of a cutting tool.

A further possible use of the combination of the pinch ring tool and physical simulation is shown in FIG. 5 in four steps 44, 45, 46 and 47.

At first, at 44, as in the case illustrated by FIG. 4, the user positions the ring on a region of the mannequin body 22 where the mesh 49 he wants to modify is placed.

In the next step, step 45, the user clicks the mouse button and drags cursor 36 upwards to move and open the region of the selected mesh. The ring gradually increases its radius during the dragging movement, making the altered region 49 of the mesh to acquire a conical format 50 and cover the mannequin 22 head.

Past 46, the user makes use of the scissors tool to cut the mesh surface 48a. To perform the cutting, the user clicks on two spots (51a and 51b) on the screen, determining a straight line segment. This segment is projected on the mesh surface, creating a curve defining the 48a cut.

Finally, at step 47, the user activates the physical cloth simulation making the fabric to fall under gravity and separating the portions 48b which have been cut at previous step 46.

It is also possible to activate the physical cloth simulation embodiment without the gravity force (that is, the garment will behave as a real fabric in a zero gravity environment). This enables one to obtain deformations on the mesh surface.

Figure 6:
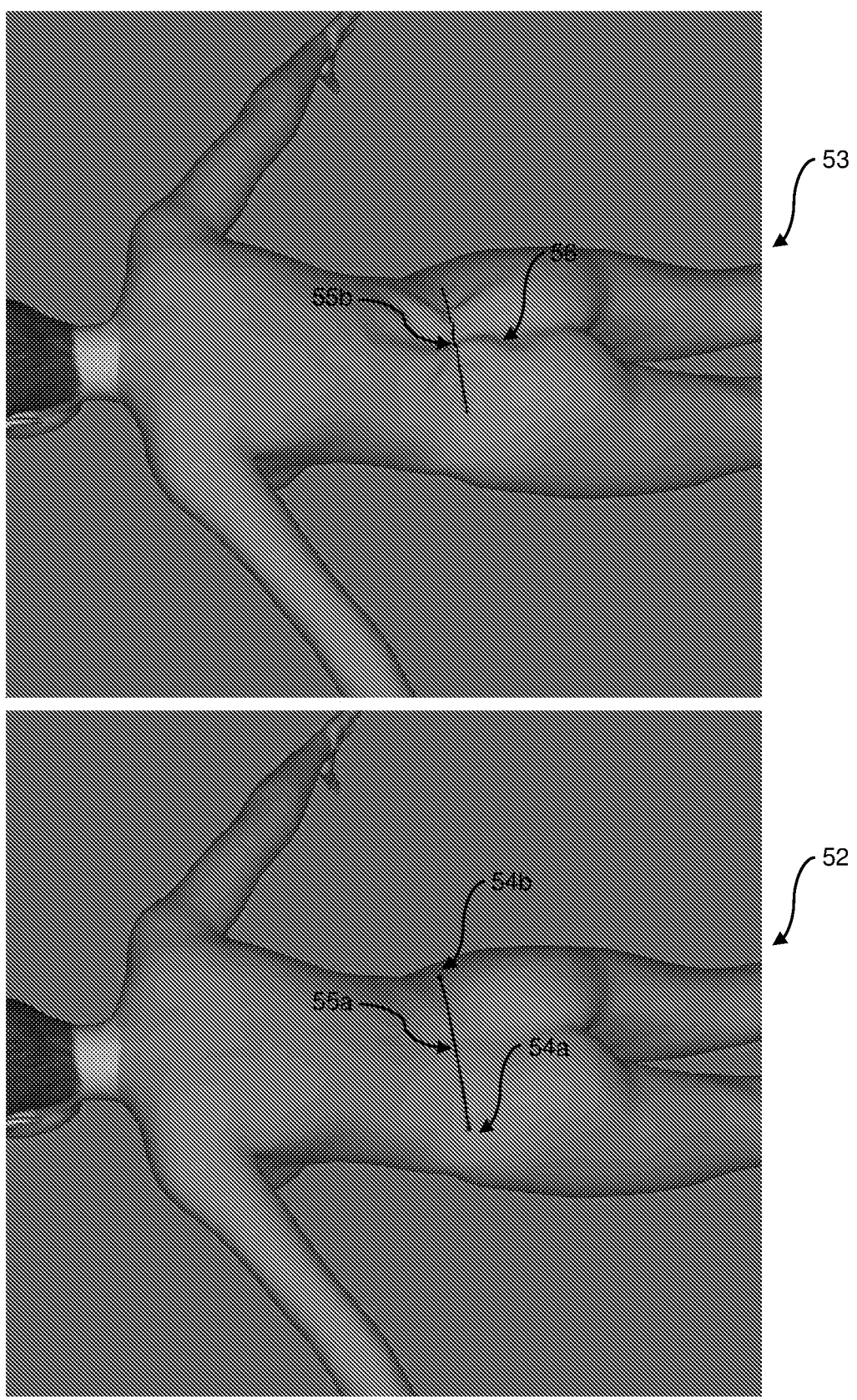
FIG. 6 attached shows the application of the pleat

The pleat tool the use of which is illustrated in FIG. 6 makes use of this property.

At first at 52 the user clicks on two spots 54a and 54b on the screen to specify a straight line segment which will be projected on the mesh surface to generate a curve 55a as in the scissors tool mentioned hereinbefore.

Then at step 53 the user turns the mouse scroll (not represented) to shorten curve 55b. Physical cloth simulation is activated without gravity and the fabric deforms only in the region of the curve created by the user, providing pleats at location 56.

Upon using the pleats tool the user does not need to be aware that the mesh is behaving as real fabric (that is, physical cloth simulation has been activated). From his point of view, the tool just applied an effect that generated pleats on the mesh surface at the region of the curve he has drawn.

Figure 7:
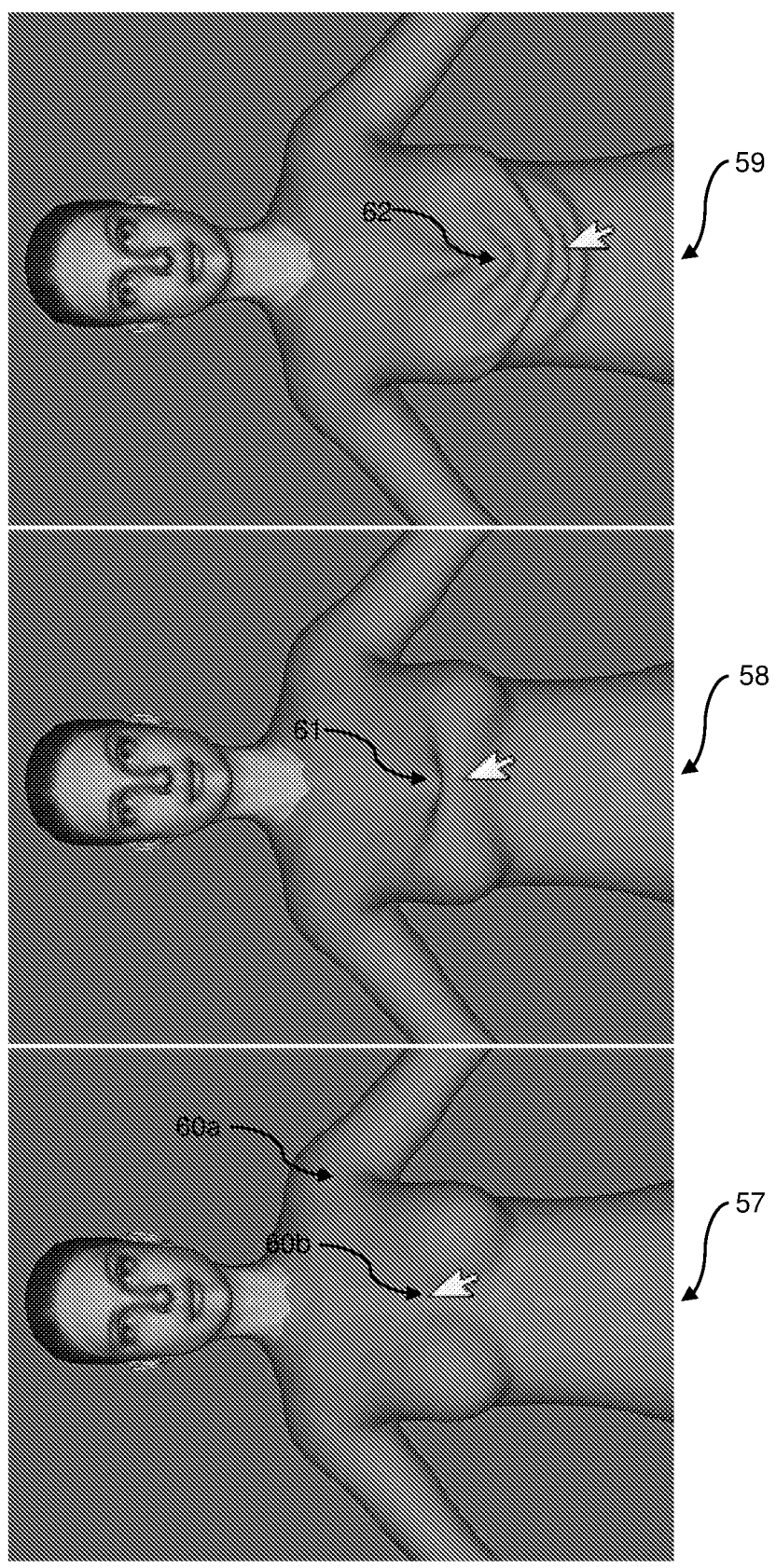
FIG. 7 attached shows the application of drag with the cloth simulation tool.

A further tool which makes use of the physical cloth simulation embodiment without gravity force is the drag tool. The working of such tool is illustrated in FIG. 7 by means of three steps (57, 58 and 59).

In the first step 57 the user positions the mouse cursor 36 on a region 60b of the mesh 60a.

Then at step 58 by clicking with the mouse button the physical cloth simulation embodiment without gravity force is activated (without showing it to the user). By moving the mouse with the blocked button, the spot clicked on the mesh is dragged, deforming the mesh surface just at region 61. Upon release of the mouse button, the cloth simulation embodiment is automatically interrupted (again without showing it to the user), The user may repeat the clicking and dragging process as many times as desired. This can be used to adjust the mesh format or create pleats on its surface. In FIG. 7, for example, the user clicks and drags a second time 59 to create a "silly collar" 62.

The program making use of the method proposed in the invention represents internally a mesh surface having a structure constituted by several triangles which discretize such surface. This representation is from now on designed in the present specification by the expression "triangular mesh".

Figure 8:
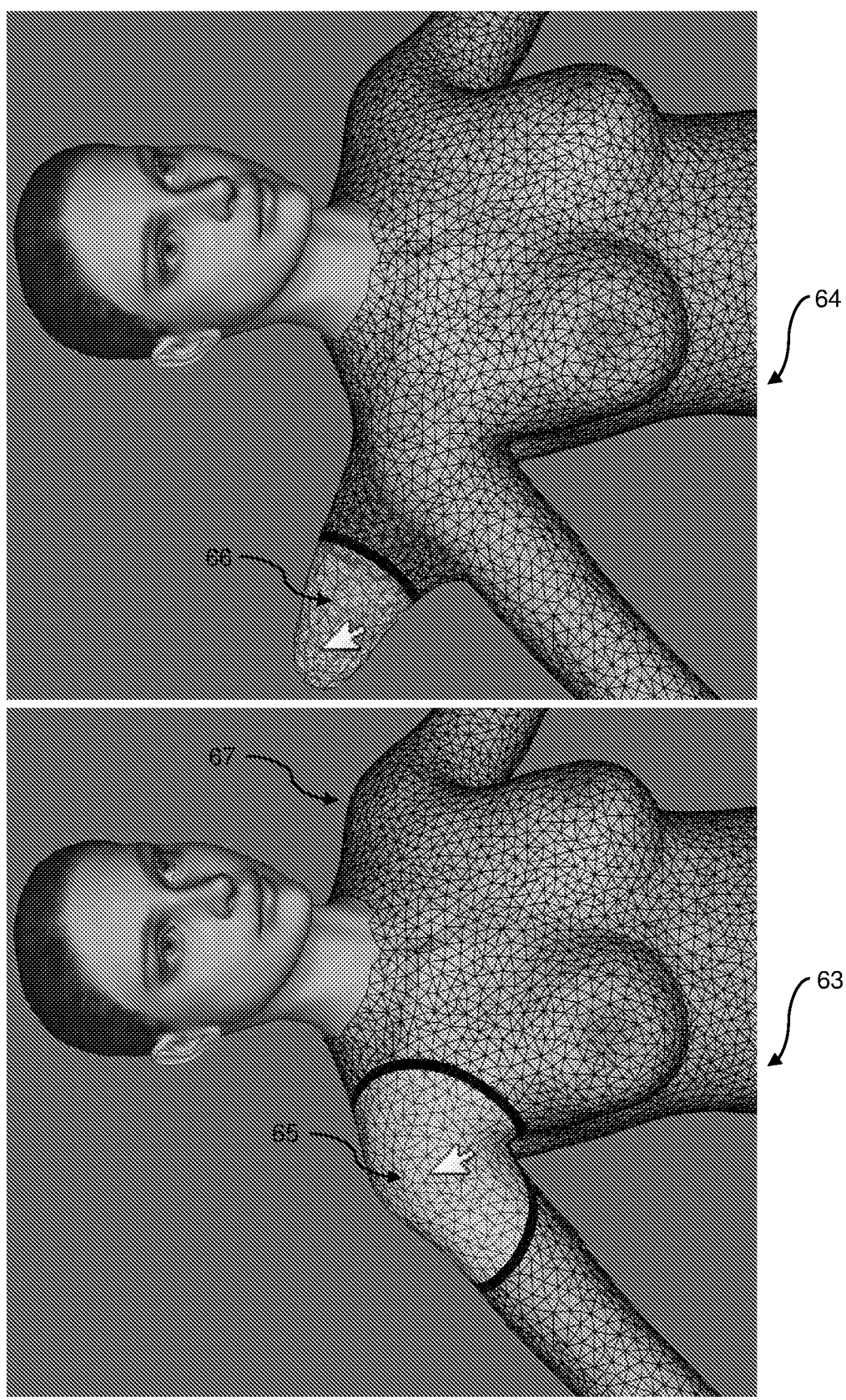
FIG. 8 attached is a view of the triangular mesh used to represent the garment surface.

FIG. 8 shows the structure of a triangular mesh 67 during the application of the pinch tool described hereinbefore.

In a first step 63 the user positions the mouse cursor 36 on a mesh region 65 which he desires to pull. Then at step 64 he clicks the mouse button and drags the cursor 36 towards the desired direction. In order to represent the new surface mesh, triangles 66 are automatically created and destroyed as a result of the user movement of the mouse cursor 36.

The description above represents the computerized method according to the invention for creating and editing surfaces for representing garments on a mannequin body in a three-dimensional virtual medium, said method comprising the following steps:

a. Representing a garment 23 surface on a mannequin body 22 by means of a triangular mesh 67;
b. Placing the triangular mesh 67 of step a) on the said mannequin body 22;
c. With the aid of digital sculpture tools, allowing the triangular mesh 67 representing the garment 23 surface to be manipulated as if it were clay;
d. With the aid of physical cloth simulation, allowing the triangular mesh 67 representing the garment 23 surface to be manipulated as if it were real fabric;
e. Allowing the manipulations described in steps c) and d) to be performed in any order, for the number of times as required to impart to the garment the format considered as suitable; and
f. At all times, preventing the triangular mesh 67 from moving towards the region in the interior of the mannequin body 22.

As described above, the program utilizing the method proposed in the invention has two distinct embodiments, which differ on the way a certain mesh behaves:

a) "Sculpting": the mesh behaves as if it were made of a clay-like material. It allows the user to freely alter the mesh surface. For example, the pinch and pinch ring tools make use of this embodiment;
b) "Simulation": the mesh behaves as if it were made of real fabric. The user can either activate the cloth simulation embodiment explicitly (with or without gravity force), or the cloth simulation can be activated and inactivated implicitly such as for example when use is made of the drag and pleat tools.

The drag and pleat tools described above in the present specification require that the program be able to quickly enter and exit the cloth simulation embodiment, the user being not aware of it.

Such quick, automatic alternation between embodiments (that is, without warning the program user) is a key aspect of the present method.

The user of the computerized method on which is based the present program is never explicitly informed on the actual garment status, neither on the change in status. The user just chooses a tool to apply a certain effect on a mesh surface.

The implementation of a computer program able to perform efficiently such alternation between the sculpting and simulation embodiments is not trivial and not anticipated by any state-of-the-art technique.

In order to make such performance viable one requirement is the absence of a huge computational cost involved in the exchange of statuses. According to the proposed method this is made possible since both sculpting and cloth simulation embodiments use the same data structure to work: a triangular mesh.

Stanculescu, L. et al. report in the article "Freestyle: Sculpting meshes with self-adaptive topology" (Computers & Graphics, 2011, Preprint pages 1-12) a method for sculpting volumetric objects by directly using a triangular mesh representation. The sculpting embodiment of the present method is based on the method described by Stanculescu, L. et al.

As mentioned above in the present specification, the cloth simulation embodiment of the computerized method used in the present program is also developed by using the same triangular mesh structure. The use of a triangular mesh to represent fabric in computational physical cloth simulation is described by Baraff, a and Witkin, A. in "Large steps in cloth simulation" (Computer Graphics Proceedings, 1998, Annual Conference Series, p. 43-54) and in several subsequent papers.

Internally the sculpting embodiment can change the triangular mesh structure used for representing the garment surface, that is, additional triangles can be added or removed during the application of a tool. On the contrary in the cloth simulation embodiment just the vertices positions of the triangles are altered, that is, no triangle is added or removed.

As compared with U.S. Pat. No. 7,409,259B2—which utilizes parametric surfaces to represent the garment and allows the user to manipulate the control spots of the said surface to adjust the garment on the mannequin body—it is believed that the sculpting embodiment of the method described in the present invention provides a more intuitive manner for the user to perform the desired modifications on the garment surface, since it is based on already existing digital sculpting programs (e.g., "ZBrush").

The cloth simulation embodiment of the method described in the present invention, on its turn, provides more agility to the user in the creation of fabric pleats. The presence of pleats in the fabric imparts a more realistic aspect to the garment. This agility for creating pleats on the garment surface provided by the cloth simulation embodiment cannot be not obtained by the method described in U.S. Pat. No. 7,409,259B2 nor by generic digital sculpting programs.

Differently from both the computerized method and program described in U.S. Pat. No. 7,409,259B2 the present computerized method allows to:

1) Creating garments of any topology from a single initial configuration (dispensing with the need of three initial kinds of garment as is required by the technique described in U.S. Pat. No. 7,409,259B2 cited above);
2) Easily generating pleats in the garment surface with the aid of the cloth simulation embodiment; and
3) Being easily learned by users of generic digital sculpting programs since the functionalities of its tools are similar to those used in programs aiming at the same purposes.

In this way it is possible to state that the computerized method described in the present invention is a specific digital sculpting method for garment design, said method having not been described nor suggested by the state-of-the-art technique.

The invention claimed is:

1. A computerized method for creating and editing surfaces for representing garments on a mannequin body in a three-dimensional virtual medium, said method being characterized in that it comprises the steps of:
   a) Representing a mannequin 22 clothed with an overall piece garment 23 surface by means of a triangular mesh 67, covering the mannequin's body;
   b) With the aid of digital sculpture tools, allowing the triangular mesh 67 representing the garment 23 surface to be manipulated as if it were clay, wherein the structure of the triangular mesh representing the garment surface is modified by adding or removing triangles;
   c) With the aid of physical cloth simulation, allowing the triangular mesh 67 representing the garment 23 surface to be manipulated as if it were real fabric;
   d) Allowing the manipulations described in steps b) and c) to be performed in any order, for the number of times as required to impart to the garment the format considered as suitable; and
   e) At all times, preventing the triangular mesh 67 from moving towards the region in the interior of the mannequin body 22, and
   f) Activating the physical cloth simulation embodiment to allow a piece of the mesh to fold over at least a part of the overall piece of garment 23 forming thereby multiple layers.

2. The method according to claim 1, characterized in that in step c) alternatively the said physical cloth simulation embodiment is activated in the absence of the gravity force so as to obtain deformations located on the surface of said triangular mesh 67.

3. The method according to claim 1, further comprising the steps of cutting the overall piece garment to obtain a plurality of pieces and selecting a mesh type for each of the plurality of pieces, wherein the different mesh types have different properties selected from the group of texture, color or shine.

4. A computerized method for creating and editing surfaces for representing garments on a mannequin body in a three-dimensional virtual medium, said method being characterized in that it comprises the steps of:
   a) Representing a mannequin 22 clothed with an overall piece garment 23 surface by means of a triangular mesh 67, covering the mannequin's body;
   b) With the aid of digital sculpture tools, allowing the triangular mesh 67 representing the garment 23 surface to be manipulated as if it were clay, wherein the structure of the triangular mesh representing the garment surface is modified by adding or removing triangles;

c) With the aid of physical cloth simulation, allowing the triangular mesh 67 representing the garment 23 surface to be manipulated as if it were real fabric;
d) Allowing the manipulations described in steps b) and c) to be performed in any order, for the number of times as required to impart to the garment the format considered as suitable; and
e) At all times, preventing the triangular mesh 67 from moving towards the region in the interior of the mannequin body 22,
f) Positioning a pinch ring tool on a region of the mannequin body where the mesh to be modified is placed, stretching the triangular mesh by adjusting the radius of the pinch ring and cutting the triangular mesh, and
g) Activating the physical cloth simulation embodiment to allow a piece of the mesh to fold over at least a part of the overall piece of garment 23 forming thereby multiple layers.

\* \* \* \* \*